United States Patent [19]

Altman et al.

[11] 4,172,715
[45] Oct. 30, 1979

[54] METHOD OF MAKING SODA MATTE SLAGS RESISTANT TO SPONTANEOUS COMBUSTION

[75] Inventors: Roger L. Altman, East Windsor; Karl D. Libsch, Princeton; M. Vikram Rao, Princeton Junction, all of N.J.

[73] Assignee: N L Industries, Inc., New York, N.Y.

[21] Appl. No.: 937,921

[22] Filed: Aug. 30, 1978

[51] Int. Cl.$^2$ ............................................... C22B 7/04
[52] U.S. Cl. ........................................... 75/24; 75/69; 75/77; 106/288 B
[58] Field of Search ............... 75/24, 77, 78, 69, 257; 106/288 B; 65/19, 20

[56] References Cited

U.S. PATENT DOCUMENTS

| | | | |
|---|---|---|---|
| 3,052,535 | 9/1962 | Peters | 75/77 |
| 4,058,396 | 11/1977 | Birk | 75/77 |

*Primary Examiner*—M. J. Andrews
*Attorney, Agent, or Firm*—Gerald K. White

[57] ABSTRACT

The autoignition of slags produced by the soda smelting of metal containing substances such as lead and antimony bearing materials is prevented through the minimization of iron and entrained coke in the slag and through removal of entrained coke from the slag.

18 Claims, No Drawings

METHOD OF MAKING SODA MATTE SLAGS RESISTANT TO SPONTANEOUS COMBUSTION

Molten slags generated from the soda smelting of lead and antimony bearing materials are conventionally treated for ultimate disposal by pouring the slag into a slag pot, permitting the slag to solidify, and then removing the solidified slag to a land fill area. These slags may be subject to auto-ignition, or stated another way, spontaneous combustion, unless control of the slag making constituents and the resultant slag composition is exercised. As the combustion of these slags could create environmental problems, a technique that ensures that such combustion will not occur is of substantial utility from the standpoints of maintaining existing air and water quality. This invention relates to several techniques that have proven to be successful in the avoidance of the spontaneous combustion of soda matte slags.

Soda matte smelting of lead battery slimes is discussed in an article by A. S. Tsimirinow et al., entitled "Features of Soda Smelting of Lead Battery Slime", *Soviet Non-Ferrous Metals Research*, 2 (1), pages 13–16 (1974). The article discusses the addition of fluxes such as limestone, iron filings, and quartz sand along with various quantities of soda ash and charcoal to the lead slimes. Soda matte smelting in rotary-oscillatory furnaces is illustrated in an article by J. Warczok, et al., entitled "About the Possibilities for Increasing the Yield in the Process of Lead Smelting in Rotary-Oscillatory Furnaces", *Pr. Inst. Met. Niezelag.* 3 (4), pages 189–191 (1974). A charge of sodium carbonate, iron scrap, coke breeze, and lead bearing materials is introduced into the furnace. FIG. 2 of the article discusses optimization of the iron and soda additions. Another soda matte lead smelting technique includes the use of a short rotary furnace as discussed by W. J. Roscrow in an article entitled "Furnaces and Processes for Non-Ferrous Metal Recovery", *Metallurgia Met. Forming (U.K.)*, 42 (8), pages 272–274, 276, Aug (1975). In addition, U.S.S.R. Patent Number 361,212 pertains to the use of sodium-matte slags for the extraction of lead with use of oxygen enriched air. The direct smelting of iron-containing lead ores and concentrates with sodium bicarbonate and carbon is discussed in an article by A. R. Chesti entitled "Direct Reduction of Lead by Soda Bicarb and Carbon", *Journal of Mines, Metals & Fuels*, 22 (3), pages 85–86, March (1974). None of the above cited publications mentions or solves problems related to the autoignition of slags resulting from the soda matte smelting of metal bearing substances such as lead or antimony bearing materials.

While not intending to be bound by the following theory, it is presently believed that the autoignition of soda matte slags is related to reactions which occur to the slag following deposition at an appropriate disposal site. Due to reaction with carbon dioxide and water vapor from the air, following reactions (1) through (6) occur:

$$Na_2S + H_2O \rightarrow NaHS + NaOH \quad (1)$$

$$NaOH + Na_2S + CO_2 \rightarrow Na_2CO_3 + NaHS \quad (2)$$

$$Na_2S + 9H_2O \rightarrow Na_2S.9H_2O \quad (3)$$

$$Na_2CO_3 + 10H_2O \rightarrow Na_2CO_3.10H_2O \quad (4)$$

$$NaHS + 2H_2O \rightarrow NaHS.2H_2O \quad (5)$$

$$Na_2S_2O_3 + 5H_2O \rightarrow Na_2S_2O_3.5H_2O \quad (6)$$

Concurrent with reactions (1) through (6), iron sulfide begins to break down upon exposure to water and air as shown in reaction (7):

$$FeS + 3/2 H_2O + \tfrac{3}{4}O_2 \rightarrow FeO(OH).H_2O + S° \quad (7)$$

The hydrated ferrous oxide is produced in a finely divided form which becomes unstable as the slag dries and produces ferric oxide through spontaneous reaction at ambient temperatures in accordance with reaction (8):

$$2\, FeO(OH).H_2O \leftarrow Fe_2O_3 + 3H_2O \quad (8)$$

The localized heat produced by reaction (8) is sufficient to ignite the elemental sulfur produced from reaction (7) and entrained coke as shown in reactions (9) and (10):

$$S° + O_2 \xrightarrow{165°-250° C.} SO_2 \quad (9)$$

$$C + O_2 \xrightarrow{>250° C.} CO_2 \quad (10)$$

The soda matte slags of the invention are a by-product of various known soda smelting techniques which may be performed in reverberatory and short rotary furnaces as well as in rotary kilns. However, it will be understood by those skilled in the art that the invention is not limited to such furnaces or processes.

Typical soda smelting processes involve the use of feed materials such as fluxes, a reducing agent, and metal bearing substances. Fluxing materials may include soda ash, iron filings, calcium-containing materials such as limestone, and various silica-containing materials. The reducing agents typically are carbonaceous materials such as charcoal, coke breeze, various peats, coal fines, as well as scrap battery cases and other organic materials. Metal bearing substances include oxides, sulfates, chlorides, and combinations thereof of lead and/or antimony. Such substances may be in the form of flue dusts, drosses, slimes, residues, etc.

Soda matte slags generated by smelting processes can be rendered resistant to spontaneous combustion, i.e., the occurrence of such form of combustion occurs infrequently, if at all, upon storage at a disposal site, either through process control or by a subsequent treatment that serves to minimize or eliminate the contributors to reactions which underlie the slag autoignition problem. The choice of a specific technique is dependant upon the operating constraints of a specific metal producing facility.

Essentially all of the iron that is charged to the smelting vessel in soda matte metal smelting processes is retained in the slag, a large portion being in the form of iron sulfides. By the substantial elimination of iron from the feed materials and consequent minimization of the iron content in the slag, the unfavorable localized heat produced by the combination of reactions (7) and (8) can be minimized to the extent that a slag that is resistant to spontaneous combustion is generated upon smelting. Because the fluxing function performed by iron is lost through the supression of deliberate iron additions to the smelting change, it is necessary to add correspondingly larger amounts of other fluxing materials such as soda ash, limestone, silica sand, or the like. The choice and amount of such additional material is dependant upon the particular type of smelting process as well as the specific composition of the metallic substance to be smelted.

It has been determined that the iron input should be restricted in the smelting charge because iron in the resultant soda matte slags contributes to spontaneous combustion. Controls to such levels have been determined to be helpful in making soda matte slags resistant to spontaneous combustion. It will be appreciated by those skilled in the art that an absolute upper limit for the weight percent of iron charged to the smelter is difficult to specify with exactness due to the variety of smelting techniques and the variable relative volume of slags produced by such techniques. For most techniques, however, a restriction of the iron to no more than about 2% by weight of the total charge will lead to slags that are resistant to spontaneous combustion that contain no more than about 6% by weight of iron. It is preferred to limit iron in the charge to about no more than 1.2% to thereby typically achieve a maximum iron content in the slag on the order of no more than about 2.5%.

The amount of heat generated as measured by the Differential Scanning Calorimeter, upon leaching of low iron soda matte slags is significantly smaller than the heat produced upon leaching of typical soda matte slags as demonstrated in Table I. The low iron slags had the following nominal composition: 30% sodium, 12% sulfur, 3% iron, 4% lead, 35% oxygen, 10% unreacted carbonaceous material, balance other slag constituents.

The iron-free slags generated an average of 50.7 cal/gram while the typical iron-containing slags generated an average of 189.5 cal/gram upon leaching. Leaching was performed by adding water to the slag to form a resultant mixture containing 50% by weight of each component. The mixture was then agitation leached with use of magnetic stirring for time periods ranging from 2 to 50 hours. Following agitation leaching, the filtrate was decanted and the resulting residue was dried for 16 hours under vacuum and the Differential Scaning Calorimeter used to measure heat generated.

TABLE I

| Trial | Low-Iron Slag heat generated (cal/g) | Typical Slag heat generated (cal/g) |
| --- | --- | --- |
| 1 | 0 | 204 |
| 2 | 40 | 405 |
| 3 | 35 | 92 |
| 4 | 71 | 75 |
| 5 | 0 | 177 |
| 6 | 37 | 184 |
| 7 | 70 | |
| 8 | 89 | |
| 9 | 31 | |
| 10 | 31 | |
| 11 | 157 | |
| 12 | 47 | |

A quantity in excess of the stoichiometric amount of carbonaceous material required to reduce the lead and-/or antimony bearing substance to metal is added to the smelting furnace charge. Unreacted carbonaceous material will be retained in the slag. Hence, control of carbon input to the charge is also a helpful aspect in the avoidance of soda matte autoignition. It has been determined that for typical soda matte smelting applications, the carbon contained in the feed should not exceed about 15% by weight of the total charge. Such restriction to the charge materials should normally result in no more than about 4% unreacted carbonaceous material in the slag.

It will be appreciated by those skilled in the art, however, that an absolute upper limit for charged carbon is somewhat difficult and unrealistic to specify with exactness because of the variety of smelting techniques and operating practices available to the artisan. Instead the focus should be placed upon the amount of unreacted carbonaceous material obtained in the slag. It has been found that a 4% unreacted carbonaceous material maximum is compatible with a reduced tendency toward slag autoignition. A maximum of about 2% by weight unreacted carbonaceous material is considered to be preferred from the standpoint of representing a lower, but commercially practicable, level that further ensures the creation of a soda matte slag that is resistant to spontaneous combustion. For example, it is possible to operate soda matte smelting processes at levels of about 10% carbonaceous feed material and obtain less than about 2% unreacted carbon in the slag.

Based upon the above information, it has been determined that soda matte slags of the general and preferred compositions set forth below are resistant to spontaneous combustion upon storage at an appropriate disposal site:

| Element | General Wt. % | Preferred Wt. % |
| --- | --- | --- |
| Sodium | 15/45 | 15/45 |
| Sulfur | 10/25 | 10/25 |
| Iron | 6 max | 2.5 max |
| Unreacted carbonaceous material | 4 max | 2 max |
| Metal | up to 10 | up to 10 |
| Oxygen | 15/45 | 15/35 |

Such slags also may typically contain other slag ingredients such as silicates from 2% to 15%, carbonates from 2% to 10%, and chlorides from 1% to 10%, as well as other fluxing materials.

It is also possible to obtain spontaneous combustion resistant soda matte slags by a separate technique that also embodies the principles of the invention. Such technique comprises generating a soda matte slag in which no special restriction is placed upon the content of the charge materials during smelting. Physical, chemical, or combined physical and chemical techniques may be subsequently used to treat the soda matte slag through reduction of the quantity of unreacted carbonaceous material to the extent that the slag becomes resistant to spontaneous combustion.

Physical separation techniques include those that would rely upon differences in specific gravity, size, shape, etc. of the unreacted carbonaceous material and the other slag components. Typical techniques include dry cycloning, electrostatic separation with use of an electrostatic precipator and like techniques.

Chemical techniques may suitably include reacting the unreacted carbonaceous reducing agent in the slag with an oxygen-containing gas or compound to react a sufficient quantity of the reducing agent to obtain a carbon level that will avoid the spontaneous combustion problem. It has been found that if the unreacted carbon level is reduced to 4%, preferably 2%, that a slag that is resistant to spontaneous combustion is obtained. An oxygen containing gas such as oxygen-enriched air or substantially pure oxygen may be lanced into the slag from above or passed through the slag with use of a pipe or tuyere. Soda matte slags of the following general and preferred compositional limits are suitable for treatment with the gaseous oxygen embodiment:

| Element | General Wt. % | Preferred Wt. % |
|---|---|---|
| Sodium | 15/45 | 20/25 |
| Sulfur | 10/25 | 16/24 |
| Iron | up to 35 | 15/20 |
| Unreacted carbonaceous material | 5/30 | 5/10 |
| Metal | up to 10 | up to 10 |
| Oxygen | 15/45 | 15/35 |

It is preferred to limit sodium and iron to the levels shown in the preferred ranges so as to form a lower melting point slag which permits oxygen blowing at lower temperatures and for longer times without freezing of the slag. It is preferred to maintain carbon at lower levels so as to minimize the amount of blowing required to lower unreacted carbon to the requisite level.

As an example of this process embodiment, oxygen lancing was used to reduce entrained coke in soda matte slags from 5.2% to 0.57%. A 200 gram sample of low iron soda matte slag was lanced with commercially pure oxygen at a rate of 85 liters per hour for about 40 minutes.

A suitable chemical-physical technique includes the partial oxidation of the molten slag with use of a suitable technique such as lancing to cause a reduction in the viscosity of the slag which in turn permits the separation of the carbon particles from the slag by floating and subsequent skimming.

What is claimed is:

1. A method of rendering a soda matte slag resistant to spontaneous combustion, comprising:
treating a soda matte slag containing unreacted carbonaceous material to reduce the quantity of unreacted carbonaceous material to the extent that said slag becomes resistant to spontaneous combustion.

2. The method of claim 1, wherein:
said unreacted carbonaceous material is reduced to below about 4%.

3. The method of claim 2, wherein:
said soda matte slag contains about 6% maximum iron.

4. The method of claim 2, wherein:
said unreacted carbonaceous material is reduced to below about 2%.

5. The method of claim 1, wherein:
said soda matte slag is treated by reacting said unreacted carbonaceous material with an oxygen-containing gas.

6. The method of claim 1, wherein:
said slag consists essentially of from 15% to 45% sodium, from 10% to 25% sulfur, up to 35% iron, from 5% to 30% unreacted carbonaceous material, up to 10% metal selected from the group consisting of lead, antimony, and admixtures thereof, from 15% to 45% oxygen, balance other slag constituents prior to treatment.

7. The method of claim 6, wherein:
said slag consists essentially of from 20% to 25% sodium, from 16% to 24% sulfur, from 15% to 20% iron, from 5% to 10% unreacted carbonaceous material, up to 10% metal selected from the group consisting of lead, antimony, and admixtures thereof, from 15% to 35% oxygen, balance other slag constituents prior to treatment.

8. A method of soda matte smelting, comprising:
a. feeding controlled amounts of a fluxing material comprising soda ash, a carbonaceous reducing material, and a metal bearing substance selected from the group consisting of lead, antimony, and admixtures thereof into a smelting vessel;
b. controlling the smelting of said metal bearing substance to produce molten metal and a soda matte slag containing no more than about 6% iron that is resistant to spontaneous combustion; and
c. separating said molten metal and soda matte slag.

9. A method of soda matte smelting, comprising:
a. feeding controlled amounts of a fluxing material comprising soda ash, a carbonaceous reducing material, and a metal bearing substance selected from the group consisting of lead, antimony, and admixtures thereof into a smelting vessel;
b. controlling the smelting of said metal bearing substance to produce molten metal and a soda matte slag containing no more than about 4% unreacted carbonaceous material that is resistant to spontaneous combustion; and
c. separating said molten metal and soda matte slag.

10. The method of claim 8, wherein:
said soda matte slag contains no more than about 4% unreacted carbonaceous material.

11. The method of claim 8, wherein:
said soda matte slag consists essentially of from 15% to 45% sodium, from 10% to 25% sulfur, up to 6% iron, up to 4% unreacted carbonaceous material, up to 10% metal, from 15% to 45% oxgyen, balance other slag constituents.

12. The method of claim 9, wherein:
said soda matte slag contains up to 2.5% iron.

13. The method of claims 9 or 10, wherein:
said soda matte slag contains up to 2% unreacted carbonaceous material.

14. The method of claim 9, wherein:
said carbonaceous reducing agent is included in the smelter feed in amounts not greater than about 15%.

15. The method of claim 9, wherein:
said carbonaceous reducing agent is included in the smelter feed in amounts not greater than about 10% and said soda matte slag contains up to 2% unreacted carbonaceous material.

16. A soda matte slag characterized by having high resistance to spontaneous combustion consisting essentially of from 15% to 45% sodium, from 10% to 25% sulfur, up to 6% iron, up to 4% unreacted carbonanceous material, up to 10% of a metal selected from the group consisting of lead, antimony, and admixtures thereof, from 15% to 45% oxygen, balance other slag constituents.

17. The slag of claim 16, wherein:
said soda matte slag contains up to 2.5% iron.

18. The method of claims 16 or 17 wherein:
said soda matte slag contains up to 2% unreacted carbonaceous material.

* * * * *